United States Patent
Adachi et al.

(10) Patent No.: US 6,880,969 B2
(45) Date of Patent: Apr. 19, 2005

(54) TEMPERATURE SENSOR AND PRODUCTION METHOD THEREOF

(75) Inventors: Tomohiro Adachi, Kariya (JP); Atsushi Kurano, Kuwana (JP); Kazuto Koshimizu, Saitama (JP); Norihiko Shimura, Saitama (JP); Takamasa Yoshihara, Saitama (JP)

(73) Assignees: Denso Corporation (JP); Shibaura Electronics Co., Ltd. (JP)

(*) Notice: Subject to any disclaimer, the term of this patent is extended or adjusted under 35 U.S.C. 154(b) by 0 days.

(21) Appl. No.: 10/104,491

(22) Filed: Mar. 25, 2002

(65) Prior Publication Data

US 2002/0172258 A1 Nov. 21, 2002

(30) Foreign Application Priority Data

Mar. 23, 2001 (JP) ........................................ 2001-085723

(51) Int. Cl.⁷ ............................ G01K 7/16; G01K 1/00; H01C 7/00
(52) U.S. Cl. ........................ 374/185; 374/208; 338/25; 338/28
(58) Field of Search ............................... 374/208, 163, 374/179, 183, 185; 338/28, 30, 25

(56) References Cited

U.S. PATENT DOCUMENTS

| | | | |
|---|---|---|---|
| 3,815,074 A | | 6/1974 | Nagata |
| 3,949,609 A | * | 4/1976 | Hammerslag ................. 338/25 |
| 4,246,786 A | * | 1/1981 | Wiemer et al. ................ 338/25 |

(Continued)

FOREIGN PATENT DOCUMENTS

| | | | | |
|---|---|---|---|---|
| DE | 2321715 | | 11/1973 | |
| DE | 85 36 390 | | 2/1986 | |
| DE | 37 03 465 | | 8/1988 | |
| EP | 0 703 438 | | 3/1996 | |
| JP | 52-7535 | | 3/1977 | |
| JP | 55103435 A | * | 8/1980 | ............ G01K/7/22 |
| JP | 58150833 A | * | 9/1983 | ................. 374/185 |
| JP | 63101720 A | * | 5/1988 | ................. 374/185 |
| JP | 63145930 A | * | 6/1988 | ............ G01K/7/22 |
| JP | 01293504 A | * | 11/1989 | ................... 338/25 |
| JP | 02094402 A | * | 4/1990 | ................... 338/25 |
| JP | 02097001 A | * | 4/1990 | ................... 338/25 |
| JP | 02116101 A | * | 4/1990 | ................... 338/25 |
| JP | 02152203 A | * | 6/1990 | ................... 338/25 |
| JP | 04064026 A | * | 2/1992 | ............ G01K/7/22 |
| JP | 517 2649 | | 7/1993 | |
| JP | 06249716 A | * | 9/1994 | ............ G01K/7/22 |
| JP | 11-295126 | | 10/1999 | |
| JP | 2002267547 A | * | 9/2002 | ............ G01K/7/22 |

Primary Examiner—Diego Gutierrez
Assistant Examiner—Mirellys Jagan
(74) Attorney, Agent, or Firm—Nixon & Vanderhye PC

(57) ABSTRACT

In a temperature sensor including a pair of electrode wires for signal lead-out, bonded to both opposing end faces of a thermistor device, this invention aims at preventing peeling, of bond portions, between the electrode wires and the thermistor device. This object can be accomplished by sealing the thermistor device 3 and the bond portions between the thermistor device 3 and the electrode wires 4 by using an electrically insulating glass member 6, and holding the pair of electrode wires 4 by using a holding member 8 made of an electrically insulating ceramic while a gap is kept between them.

7 Claims, 3 Drawing Sheets

U.S. PATENT DOCUMENTS

| | | | |
|---|---|---|---|
| 4,467,309 A | * 8/1984 | Matsushita et al. | 338/25 |
| 4,538,927 A | * 9/1985 | Jochemczyk et al. | 374/163 |
| 4,934,831 A | * 6/1990 | Volbrecht | 374/183 |
| 4,972,708 A | * 11/1990 | Wiegleb et al. | 73/204.22 |
| 5,348,397 A | * 9/1994 | Ferrari | 374/185 |
| 5,681,111 A | * 10/1997 | Akbar et al. | 374/185 |
| 5,969,348 A | * 10/1999 | Franzen | 250/282 |
| 6,082,895 A | * 7/2000 | Janicek | 374/185 |
| 6,127,915 A | * 10/2000 | Gam et al. | 374/185 |
| 6,164,819 A | * 12/2000 | Moriwake et al. | 374/185 |
| 6,264,363 B1 | * 7/2001 | Takahashi et al. | 374/185 |
| 6,305,841 B1 | * 10/2001 | Fukaya et al. | 374/185 |
| 6,437,679 B1 | * 8/2002 | Roques | 338/25 |
| 6,466,123 B1 | * 10/2002 | Kuzuoka et al. | 338/25 |
| 6,501,366 B1 | * 12/2002 | Takahashi et al. | 338/25 |
| 6,639,505 B1 | * 10/2003 | Murata et al. | 338/25 |
| 6,829,820 B1 | * 12/2004 | Adachi et al. | 29/613 |
| 2002/0084884 A1 | * 7/2002 | Takahashi et al. | 338/25 |
| 2002/0090019 A1 | * 7/2002 | Marto et al. | 374/185 |
| 2002/0131477 A1 | * 9/2002 | Kurano | 374/185 |
| 2002/0136263 A1 | * 9/2002 | Wilkins | 374/185 |
| 2004/0218662 A1 | * 11/2004 | Hanzawa et al. | 374/185 |

* cited by examiner

TEMPERATURE SENSOR AND PRODUCTION METHOD THEREOF

BACKGROUND OF THE INVENTION

1. Field of the Invention

This invention relates to a temperature sensor including a pair of signal lead-out electrode wires connected to both opposing end faces of a thermistor device.

2. Description of the Related Art

A temperature sensor of this kind is described in Japanese Examined Patent Publication (Kokoku) No. 52-7535. In this temperature sensor, a pair of electrode wires is connected to both opposing end faces of a thermistor device in such a manner as to interpose the thermistor device between them, and are taken out from the thermistor device. The electrode wires and the thermistor device are bonded to one another, by baking, by using a heat-resistant, electrically conductive material.

In the existing temperature sensor described above, however, cracks occur at the bond portions between the electrode wires and the thermistor device due to vibration and thermal impact and this results, in the worst case, in the occurrence of peeling. Therefore, an improvement in the strength of the bond portions is required.

SUMMARY OF THE INVENTION

According to a first aspect of the invention, there is provided a temperature sensor including a thermistor device (3) and a pair of electrode wires (4) for taking out a thermistor signal, connected to both opposing end faces of the thermistor device in such a manner that one of the end sides thereof interposes the thermistor device between them and the other end side is taken out from the thermistor device; wherein the temperature sensor includes an electrically insulating holding member (8) for holding the pair of electrode wires while the electrode wires keep a gap between them.

According to this construction, the electrically insulating holding member holds the pair of electrode wires while the electrode wires have a gap between them. Therefore, the invention can prevent short-circuits between the electrode wires and deviation of the electrode wires resulting from vibration and thermal impact, and can eventually prevent peeling of bond portions between the electrode wires and the thermistor device.

Here, the holding member (8) can use a member having holes (8a) into which the pair of electrode wires are respectively inserted.

Preferably, an electrically insulating glass member (6) can seal the thermistor device (3) and the bond portions between the thermistor device and the electrode wires (4), and the holding member (8) can be arranged on the other end side of the pair of electrode wires with respect to the glass member.

Since the glass portion seals the bond portions between the thermistor device and the electrode wires, peeling of the bond portions can be better prevented. In this case, the holding member is disposed on the other end side of the pair of electrode wires with respect to the glass member.

Here, the glass member (6) and the holding member (8) may be spaced apart from each other, but they are preferably close to each other because the position of the glass member and its size can be more easily determined, based on the holding member as a reference.

Preferably, a cap (7) made of alumina is put on the outside of the glass member (6) because the heat resistance of the bond portions between the thermistor device and the electrode wires can be improved to a higher temperature.

The temperature sensor of the invention may include a plurality of holding members (8). Each of the means described above can fully exhibit its effect when the temperature sensor of the invention is applied to a sensor used in a high temperature environment of not lower than 500° C.

The electrode wires (4) can be made of a high melting point metal such as Pt or a Pt alloy, and the holding member (8) and the electrode wires (4) may be, in advance, fired simultaneously or bonded. They are excellent in high temperature strength and vibration resistance.

According to a second aspect of the invention, there is provided a method of producing a temperature sensor including a thermistor device (3), a pair of electrode wires (4), for taking out a thermistor signal, bonded to both opposing end faces of the thermistor device in such a manner that one of the end sides thereof interposes the thermistor device and the other end side is taken out from the thermistor device, and an electrically insulating holding member (8) for holding the pair of electrode wires while keeping a gap between them; the method comprising the steps of using a high melting point metal such as Pt or a Pt alloy for the electrode wires (4), molding ceramic powder such as alumina or zirconia into a shape having two holes for the holding member (8), and inserting the electrode wires into the holes and simultaneously firing them.

This production method can appropriately produce the temperature sensor described in the first aspect, and can also produce, appropriately, a holding member equipped with high melting point metal wires (high melting point electrode wires) excellent in high-temperature resistance and vibration resistance.

In this production method, ceramic powder can be granulated and then precision-molded, and simultaneous firing can be carried out in an atmospheric kiln or reducing furnace at 1,500 to 1,600° C.

Reference numerals in parenthesis for each means described above denotes a correspondence with the concrete means in the later-appearing embodiment.

DESCRIPTION OF THE PREFERRED EMBODIMENTS

Figure 1:
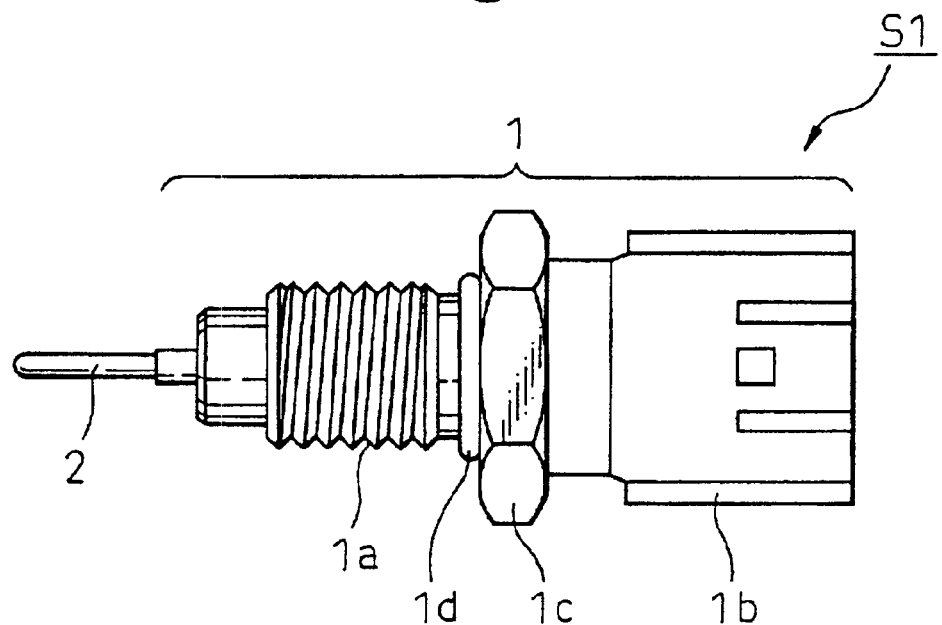
FIG. 1 is an overall appearance view of a temperature sensor according to an embodiment of this invention.
Figure 2:
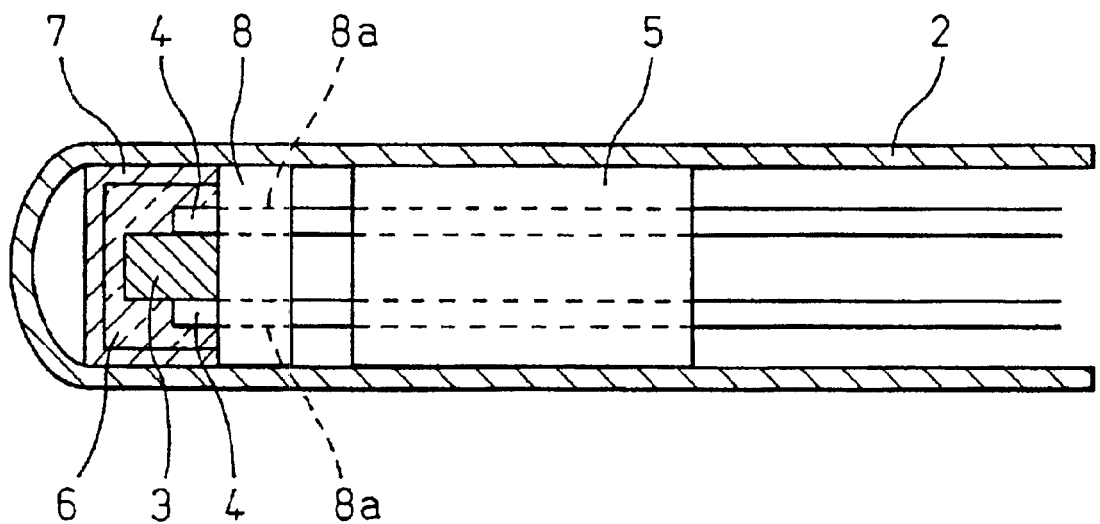
FIG. 2 is a schematic enlarged sectional view of a temperature sensitive portion in FIG. 1.

The invention will be hereinafter explained using the several preferred embodiments shown in the accompanying drawings. FIG. 1 is an appearance view showing an overall construction of a temperature sensor S1 according to one embodiment of the invention. FIG. 2 is an enlarged view showing a sectional structure inside a metal cover (metal pipe) 2 that constitutes a temperature sensitive portion in FIG. 1. This temperature sensor S1 can be applied to an exhaust gas temperature sensor used in a high temperature environment of at least 500° C., for example.

Referring to FIG. 1, reference numeral 1 denotes a housing having a shape of a stepped cylinder. The housing 1 is made of a metal material (such as a stainless steel) having high heat resistance. A screw portion 1a, capable of screw coupling with a fitting hole of a member such as an exhaust pipe, is formed on an outer peripheral surface of the housing 1 at one of its ends. A connector portion 1b to be connected to wiring members is formed at the other end of the housing 1 for establishing an electrical connection with an external circuit.

The housing 1 further includes a nut portion 1c for screw coupling with the screw portion 1a, and a seal member 1d having an O-ring and a gasket for keeping air tightness with the member to be measured. The metal cover 2 is fitted and fixed by laser welding, etc, to a contracted portion at one of the ends of the housing 1.

The metal cover 2 partitions the main body of the heat sensitive portion. It is the portion that is exposed to a measurement environment while the sensor S1 is screw-coupled with the member to be measured. The metal cover 2 is made of a heat-resistant metal such as a stainless steel. The metal cover 2 is a bottomed cylinder having a bottom portion on one of its end sides and an open portion on the other side, and having a diameter of $\phi 1.3$ mm, for example. The other end side of the metal cover 2 is bonded to the housing, and FIG. 2 shows the internal structure of the metal cover 2.

A thermistor device 3 is accommodated inside the metal cover 2 on one of its end sides (bottom side). The thermistor device 3 is a sheet-like sintered mold that is made of a semiconductor material (thermistor material) consisting of a Y—Cr—Mn oxide as its principal component, for example, and can withstand a high temperature (for example, 1,000° C. or above).

A pair of electrode wires 4 made of platinum, or the like, are connected to the thermistor device 3 inside the metal cover 2 so as to take out a thermistor signal (an output signal using the resistance (R)-temperature (T) characteristics).

One of the ends of each electrode wire 4 is connected to one of the opposing end faces of the thermistor device 3 while being exposed from the thermistor device 3. Here, the thermistor device 3 and each electrode wire 4 are bonded to each other by baking by using a heat-resistant, electrically conductive material (for example, a Pt—V paste, an Au—Ni paste, an Ag—Cu paste, etc).

The electrode wires 4 are separated from each other, and are in parallel, so that the other end of each electrode wire 4 extends towards the other end of the metal cover 2 (towards the open side) along the axis of the metal cover 2. Though not shown, the other end of each electrode wire 4 is electrically connected to a terminal provided to the connector portion 1b through a wiring member inside the housing 1.

Each electrode wire 4 extending inside the metal cover 2 penetrates through an insulator pipe 5, is held by this insulator pipe, and electric insulation is secured between the electrode wires 4 and between the electrode wire 4 and the metal cover 2. Two split members are assembled together to form the insulator pipe 5, for example.

An electrically insulating glass member 6 seals the thermistor device 3 and the bond portions between the thermistor device 3 and the electrode wires 4. This glass member 6 is made of alumina or a crystallized glass such as silica. A cap 7 of alumina is put outside this glass member 6 and is wrapped around the glass-sealed thermistor device 3.

Figure 3A:
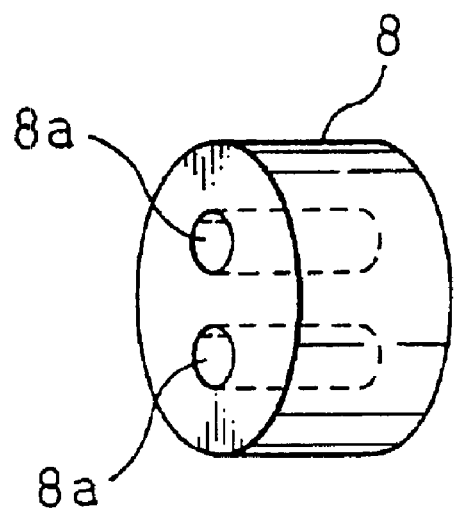
FIGS. 3(a) and 3(b) are overall appearance views respectively showing a single body structure of a holding member and a holding member equipped with electrode wires.

In this embodiment, an electrically insulating holding member 8 is disposed in the proximity of the thermistor device 3 inside the metal cover 2 so as to hold the pair of electrode wires 4. FIG. 3(a) shows a single body structure of this holding member 8.

The holding member 8 is a molded article formed of an insulating ceramic such as alumina, and has holes 8a into which the electrode wires 4 are respectively inserted, and which are spaced apart from each other in a spacing corresponding the gap between both electrode wires 4. The holding member 8 is arranged in contact with the glass member 6 between the glass member 6 and the insulating pipe 5 as shown in FIG. 2.

The other end side of each electrode wire 4 from the sealing part of the glass member 6 penetrates through each hole 8a of the holding member 8. Therefore, the holding member 8 holds the electrode wires 4 while they keep a gap between them. Incidentally, the electrode wires 4 may be held while in contact with the inner surface of the hole 8a or may be bonded and fixed to the hole 8a by using heat-resistant glass, an inorganic adhesive, the above-mentioned conductive material or a brazing material.

Alternatively, the electrode wire uses a high melting point metal such as platinum or platinum alloy (Pt—Ir, Pt—Rh, etc) and the holding member 8 is formed by molding, in advance, a ceramic powder such as alumina, zirconia, etc, into a shape having two holes (8a). The high melting point electrode wire is then inserted into the molded article and they are simultaneously fired. The resulting product is most preferred because it has high temperature strength and vibration resistance.

Figure 3B:
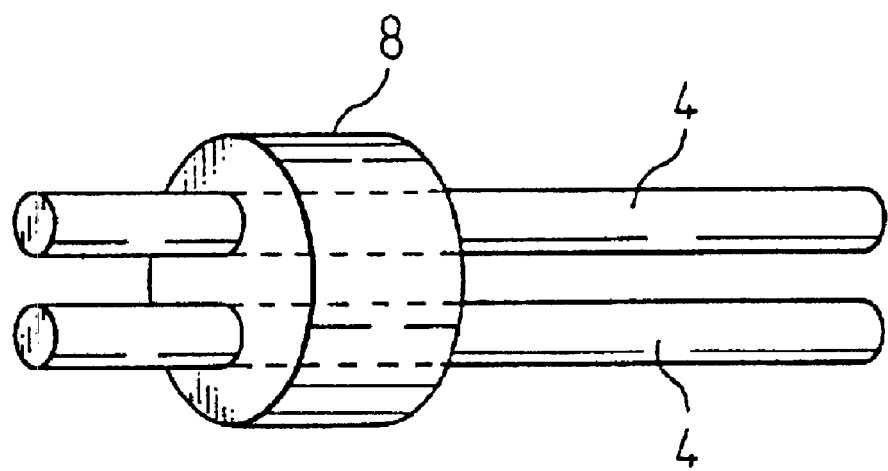

The ceramic powder described above is granulated and is then precision-molded. Simultaneous firing can be carried out inside an atmospheric kiln or reducing furnace at 1,500 to 1,600° C. In this way the holding member 8 equipped with the high melting point metal wires (high melting point electrode wires) can be obtained. FIG. 3(b) shows such a holding member 8.

The temperature sensor S1 can be assembled in the following way, as an example. The electrode wires 4 are fired to, and integrated with, both end faces of the thermistor device 3 fired and molded into the sheet-like shape, by using the electrically conductive material described above. Next, the resulting assembly is immersed in liquid glass so that the glass member 6 seals the assembly. The glass member 6 is then plugged with the cap 7.

Sealing by the glass member 6 may also be carried out by arranging the thermistor device 3, integrated with the electrode wires 4, inside the cap 7 and by then adding liquid glass. In this case, the bonding power of solidification of glass bonds the cap and the glass member 6.

Here, the step of inserting each electrode wire 4 through the hole 8a of the holding member 8 and assembling the holding member 8 with each electrode wire 4 may be carried out either before or after the sealing step by the glass member 6 described above. As this embodiment employs the construction in which the glass member 6 and the holding member 8 keep mutual contact, the position of the glass member 6 and its size can be easily determined with respect to the position of the holding member 8 and its size as the reference if the assembling step is conducted before the glass sealing step.

When assembly of the holding member 8 is carried out after the glass sealing step, the holding member 8 and the glass member 6 may merely keep mutual contact or may be bonded and fixed by using an inorganic adhesive. When assembly of the holding member 8 is made before the glass sealing step, the holding member 8 and the glass member 6 are bonded together by bonding power of glass upon solidification.

The thermistor device 3, the electrode wires 4, the glass member 6, the cap 7 and the holding member 8 are integrated with one another in the way described above. The insulator pipe 5 is then assembled to the unitary assembly so obtained, and the electrode wires 4 and the terminals of the connector portion 1b of the housing 1 are connected to one another. The metal cover 2 is put on the thermistor device 3 and is bonded to the housing 1, thereby completing the temperature sensor S1.

This temperature sensor S1 is inserted into a fitting hole (not shown) formed in an exhaust pipe of an automobile, for example, and is screw-coupled to the fitting hole through the nut 1c and the screw portion 1a. When a fluid to be measured (such as an exhaust gas) impinges against the temperature sensitive portion, the thermistor device 3 outputs a signal corresponding to the temperature of the fluid to be measured through the electrode wires 4 and the terminals of the connector portion 1b.

According to this embodiment, the electrically insulating holding member 8 holds the pair of electrode wires 4 while they maintain a mutual gap. Therefore, this embodiment can prevent short-circuit between the electrode wires 4 and deviation of the electrode wires 4 resulting from vibration and thermal impact. As a result, this embodiment can prevent peel of the bond portions between the electrode wires 4 and the thermistor device 3.

In this embodiment, the electrically insulating glass member 6 seals the thermistor device 3 and the bond portions between the thermistor device 3 and the electrode wires 4, and the holding member 8 is arranged on the other end side of the pair of the electrode wires 4 from the glass member 6. Therefore, this embodiment desirably suppresses peel of the bond portions through glass sealing in addition to the effect brought forth by the holding member 8.

In this embodiment, the holding member 8 is arranged while keeping contact with the glass member 6. Therefore, the position of the glass member 6 and its size can be easily determined with respect to the holding member 8 as the reference in the glass sealing step as described above.

According to the embodiment, the cap 7 made of alumina is put on the outside of the glass member 6. Therefore, the heat resistance of the bond portions between the thermistor device 3 and the electrode wires 4 can be desirably improved to a higher temperature.

OTHER EMBODIMENTS

Figure 4:
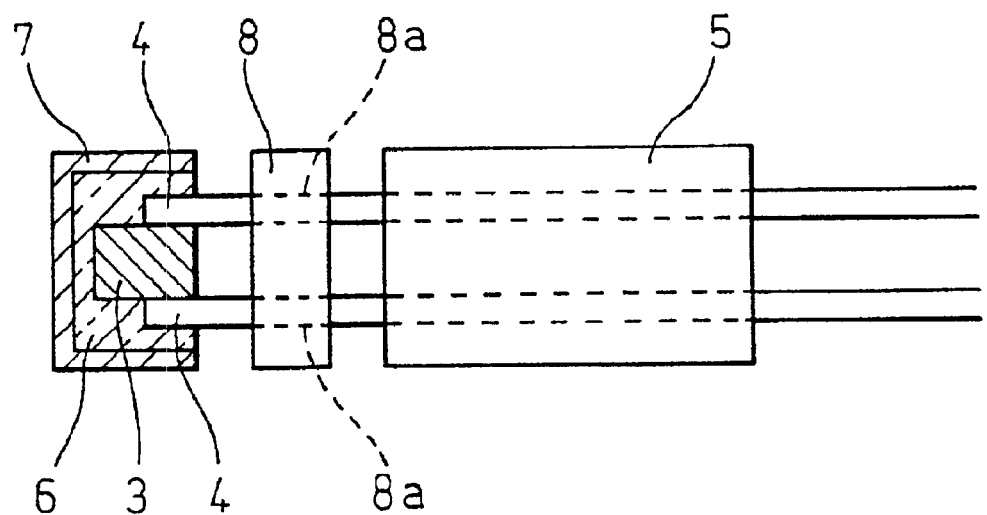
FIG. 4 shows an example where the holding member is separated from a glass member.
Figure 5:
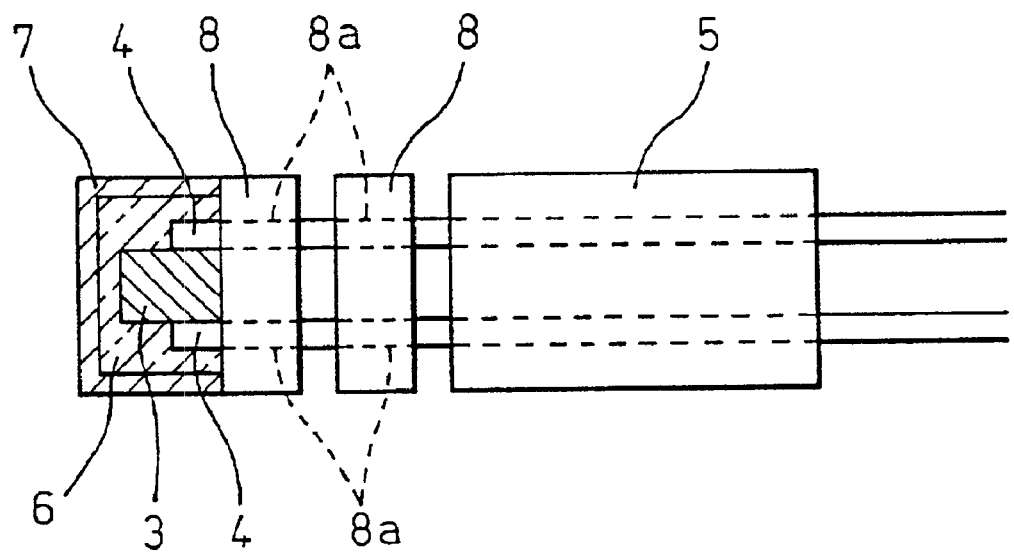
FIG. 5 shows an example where a plurality of holding members is disposed.

In the embodiment described above, the holding member 8 keeps contact with the glass member 6 and the thermistor device 3. However, the glass member 6 and the holding member 8 may be separated from each other as shown in FIG. 4. A plurality of holding members 8 may also be provided as shown in FIG. 5 (showing two holding members).

Referring to FIG. 2, the cap 7, the holding member 8, the insulator pipe 5 and the metal cover 2 are shown as in contact with one another, but they may be separated, too. However, they are preferably in contact because the diameter of the temperature sensitive portion can be decreased and its response can be improved.

In the embodiment given above, at least the effect of the holding member 8 prevents peeling of the bond portions. Therefore, the glass member 6 and the cap 7 may be omitted.

What is claimed is:

1. A temperature sensor including:

a thermistor device; and a pair of electrode wires for taking out a thermistor signal, bonded to both opposing end faces of said thermistor device in such a manner that one of the end sides thereof interposes said thermistor device between them and the other end side is taken out from said thermistor device;

wherein said temperature sensor includes an electrically insulating holding member for holding said pair of electrode wires while they keep a gap between them;

wherein said thermistor device and bond portions between said thermistor device and said pair of electrode wires are sealed by an electrically insulating glass member, and said holding member is arranged on the other end side of said pair of electrode wires relative to said glass member;

wherein said glass member and said holding member are in mutual contact;

wherein a cap made of alumina is disposed on the outside of said glass member and is in contact with said holding member;

wherein said holding member is also in contact with said thermistor device; and wherein said temperature sensor includes a metal cover in contact with said cap.

2. A temperature sensor according to claim 1, wherein said holding member has holes into which said electrode wires are inserted.

3. A temperature sensor according to claim 1, which includes a plurality of said holding members.

4. A temperature sensor according to claim 1, which is used in an environment with a temperature higher than 500° C.

5. A temperature sensor according to claim 1, wherein said holding member and said electrode wires are fired simultaneously or bonded.

6. A temperature sensor according to claim 1, wherein said electrode wires use a high melting point metal.

7. A temperature sensor according to claim 6, wherein said high melting point metal is selected from the group consisting of PT and a PT alloy.

* * * * *